No. 826,760. PATENTED JULY 24, 1906.
J. W. BRASHEARS.
FILE BOX AND SUPPORT THEREFOR.
APPLICATION FILED SEPT. 2, 1905.
4 SHEETS—SHEET 1.
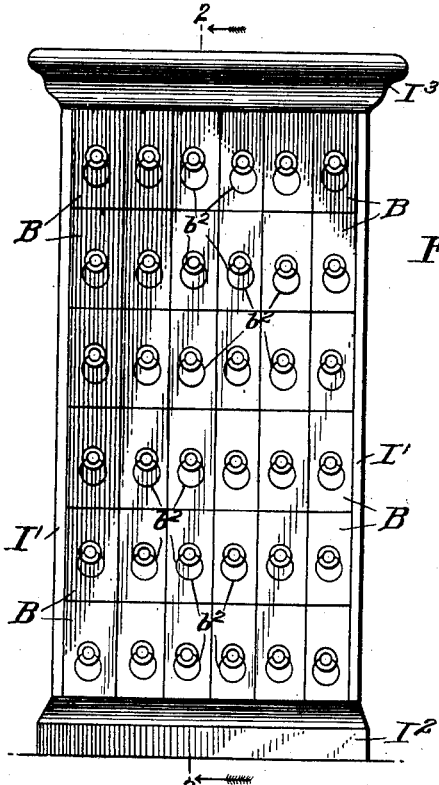
Fig. 1.
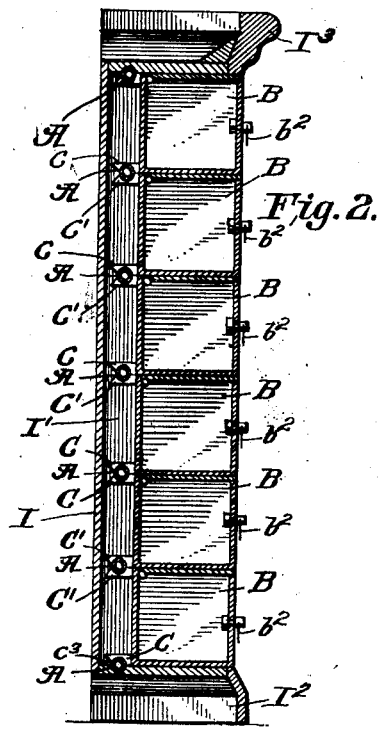
Fig. 2.
Fig. 3.
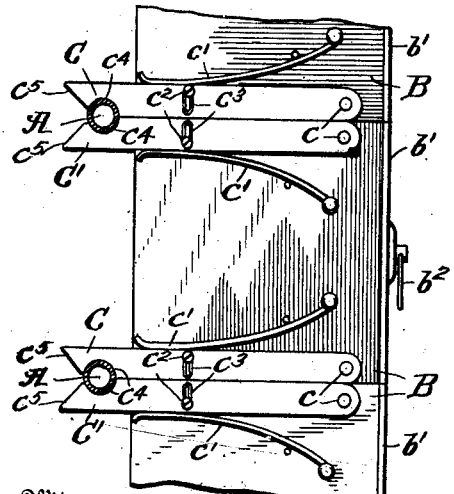
Fig. 4.
Fig. 5.
Witnesses
M. C. Lyddane
Geo. H. Luscombe
Inventor
J. W. Brashears
By J. Brashears
Attorney No. 826,760. PATENTED JULY 24, 1906.
J. W. BRASHEARS.
FILE BOX AND SUPPORT THEREFOR.
APPLICATION FILED SEPT. 2, 1905.

4 SHEETS—SHEET 2.

Witnesses
M. C. Lyddane
Geo. H. Luscombe

Inventor
J. W. Brashears
By S. Brashears
Attorney

THE NORRIS PETERS CO., WASHINGTON, D. C.

No. 826,760. PATENTED JULY 24, 1906.
J. W. BRASHEARS.
FILE BOX AND SUPPORT THEREFOR.
APPLICATION FILED SEPT. 2, 1905.

4 SHEETS—SHEET 3.

Witnesses
M. C. Lyddane
Geo. H. Luscombe

Inventor
J. W. Brashears
By S. Brashears
Attorney

No. 826,760. PATENTED JULY 24, 1906.
J. W. BRASHEARS.
FILE BOX AND SUPPORT THEREFOR.
APPLICATION FILED SEPT. 2, 1905.
4 SHEETS—SHEET 4.
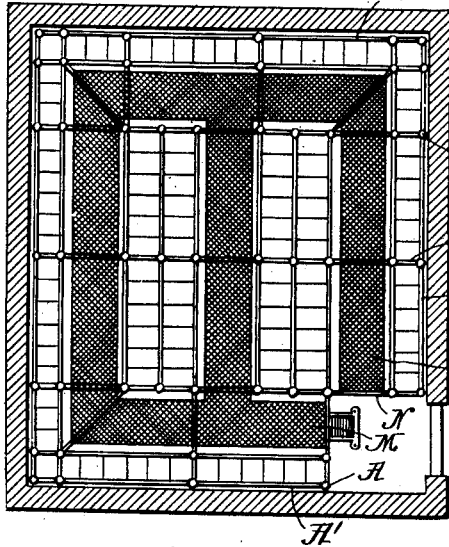
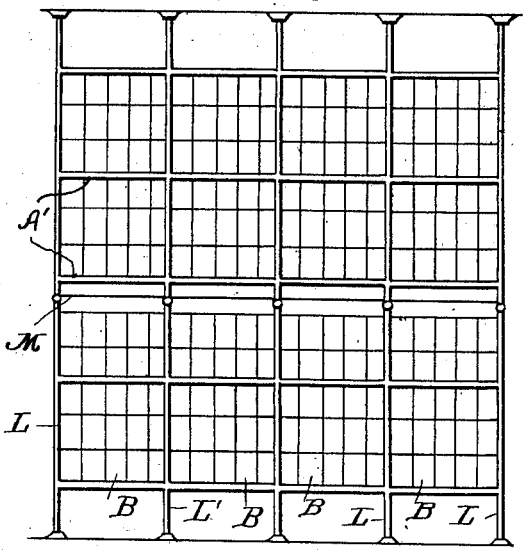
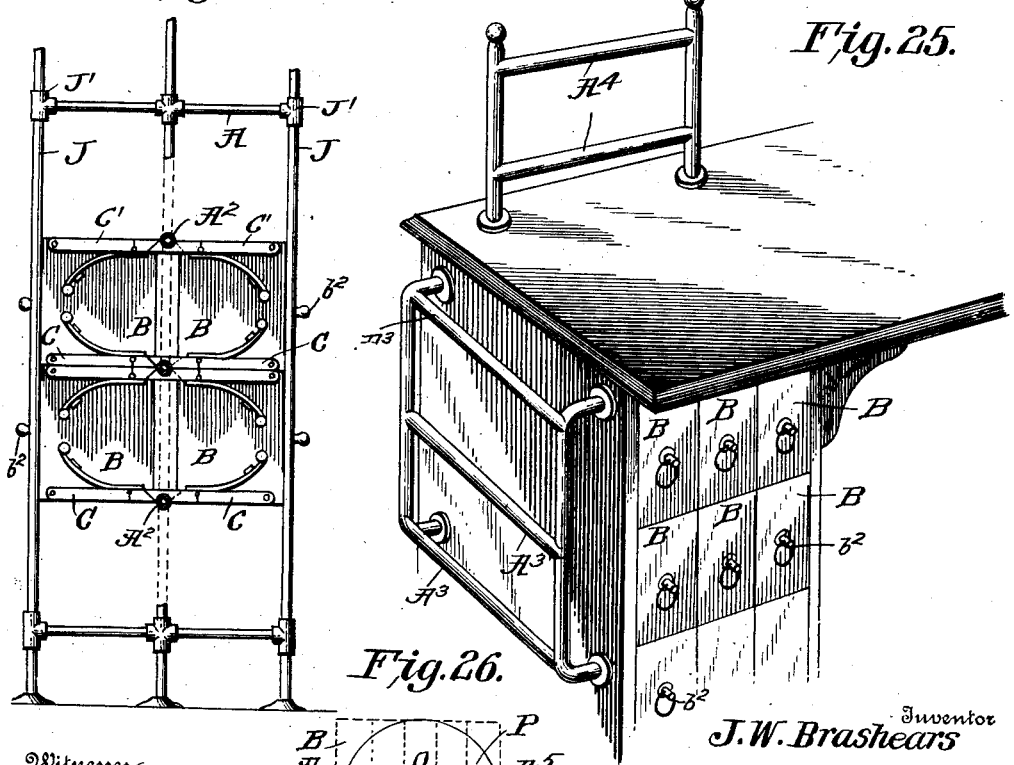
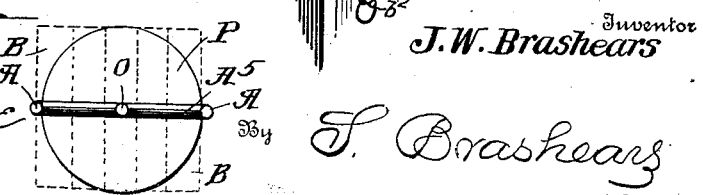

UNITED STATES PATENT OFFICE.

JOHN W. BRASHEARS, OF WINTHROP HEIGHTS, DISTRICT OF COLUMBIA.

FILE-BOX AND SUPPORT THEREFOR.

No. 826,760.  Specification of Letters Patent.  Patented July 24, 1906.

Application filed September 2, 1905. Serial No. 276,839.

*To all whom it may concern:*

Be it known that I, JOHN W. BRASHEARS, a citizen of the United States, residing at Winthrop Heights, in the District of Columbia, have invented certain new and useful Improvements in File-Boxes and Supports Therefor, of which the following is a specification.

My invention relates to file-boxes and cases or racks for supporting them; and the primary object of the invention is to provide improved devices of this class which shall be economical in construction and substantially fire, water, dust, and vermin proof, the construction to be such that the file-boxes may be instantly secured in or removed from the racks and all shelves and partitions may be dispensed with, thus increasing the utility of the structure, as well as economizing in time required in handling and space required for storing.

With these objects in view the invention consists in certain improved file cases and racks, the construction, arrangement, and combination of the parts of which will be fully described hereinafter and afterward specifically set forth in the appended claims.

Figure 6:
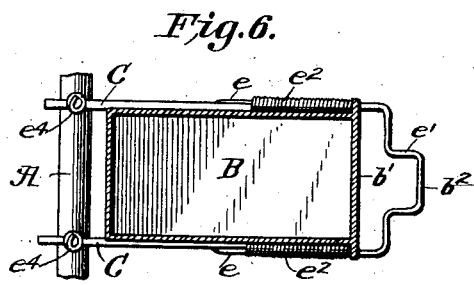
Figure 7:
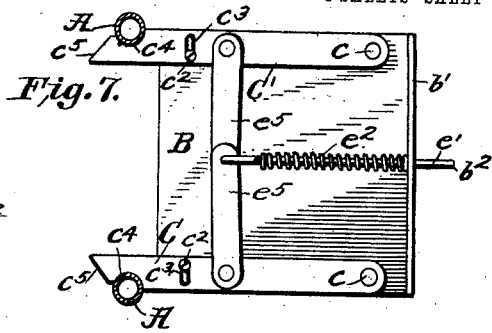
Figure 8:
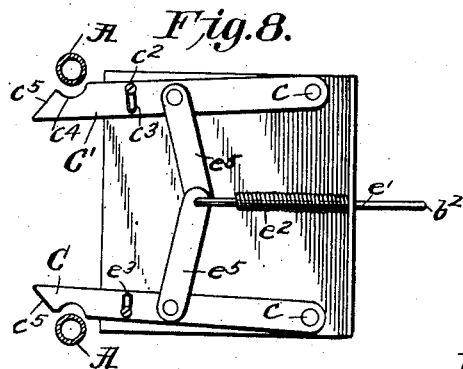
Figure 9:
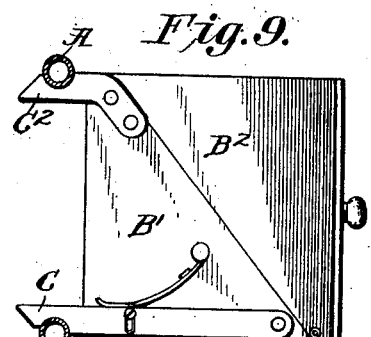
Figure 10:
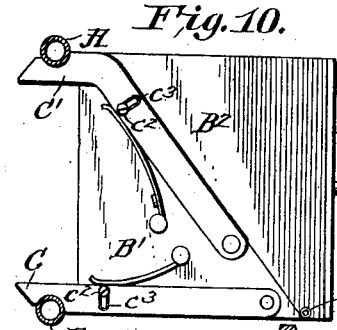
Figure 11:
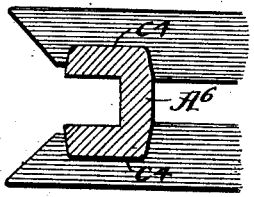
Figure 12:
Figure 13:
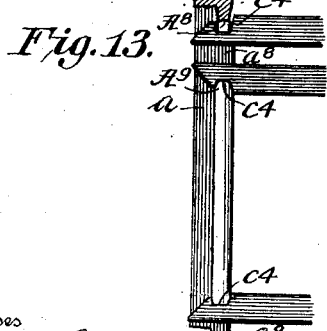
Figure 14:
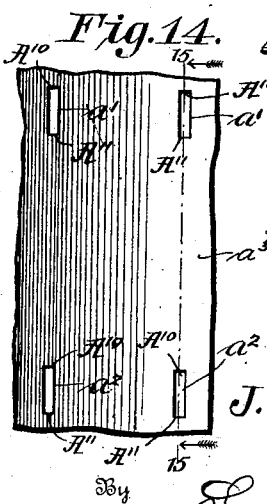
Figure 15:
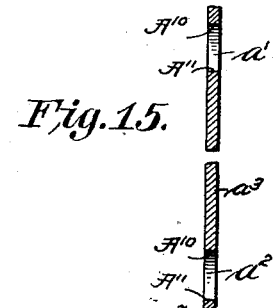
Figure 16:
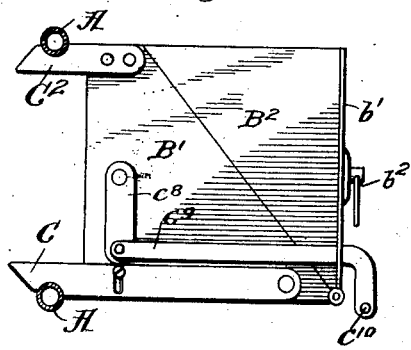
Figure 17:
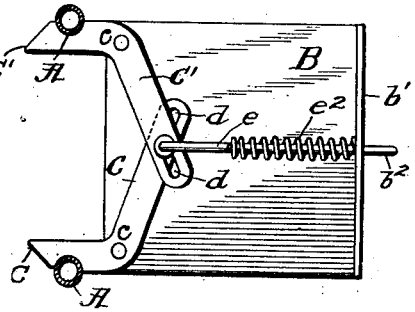
Figure 18:
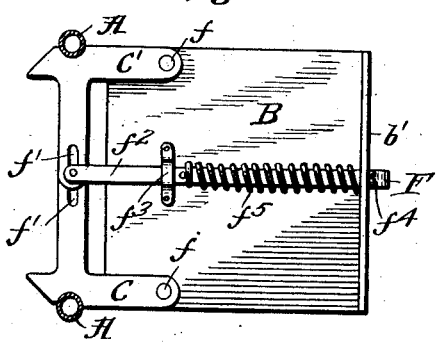
Figure 19:
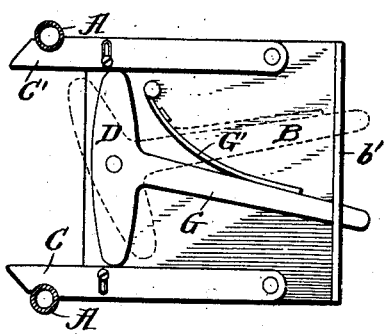
Figure 20:
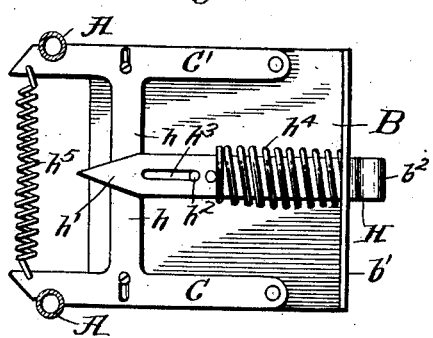
Figure 21:
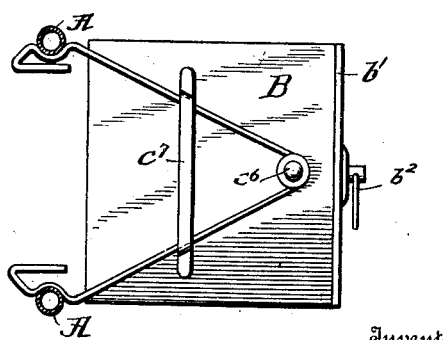

In the accompanying drawings, Figure 1 is a view in the front elevation of a file case and boxes constructed in accordance with my invention. Fig. 2 is a vertical sectional view thereof on the plane indicated by the broken lines 2 2 of Fig. 1. Fig. 3 is a vertical sectional view on a plane between two rows of file-boxes, on an enlarged scale, illustrating the means for securing the file-boxes in position on a rack or in a case. Fig. 4 is a sectional view, on the same plane as Fig. 3, illustrating a single file-box with modified means for securing it, locking means being illustrated and the parts shown in locked position. Fig. 5 is a similar view of the same parts in unlocked position. Fig. 6 is a sectional view of the parts illustrated in Figs. 4 and 5 on broken lines 6 6 of Fig. 5. Fig. 7 is a view similar to Fig. 4 with a modified form of locking mechanism in locked position. Fig. 8 is a view similar to Fig. 5, with the form of locking mechanism shown in Fig. 7 in unlocked position. Fig. 9 is a view similar to Figs. 4 and 7, illustrating another form of file-box with one rigid and one yielding latch. Fig. 10 is a similar view illustrating the form of box shown in Fig. 9, with both latches yielding. Fig. 11 is a view illustrating the application of adjacent latches, such as shown in Fig. 7, to a horizontal channel-beam instead of a pipe. Fig. 12 is a similar view with a horizontal T-beam. Fig. 13 is a view illustrating the application of the latches of Fig. 7 to a slotted vertical beam. Fig. 14 is a fragmentary view showing a plate of metal slotted to receive the latches. Fig. 15 is a sectional view of the same on the broken line 15 15 of Fig. 14. Fig. 16 is a view illustrating a locking mechanism in locked position applied to the form of box shown in Fig. 9. Fig. 17 is a view showing a box and a modified form of latches and handles. Fig. 18 is a similar view with another form of latches and locking mechanism. Fig. 19 is a similar view showing another form of latches and locking mechanism in locked position in full lines and unlocked in dotted lines. Fig. 20 is a similar view showing another form of latches and locking mechanism. Fig. 21 is a similar view showing elastic latches. Fig. 22 is a top plan view of a system of racks and boxes with which a room may be fitted, the walls of the room being shown in section on a horizontal plane above the height of the racks. Fig. 23 is a view in front elevation of a rack for one side of a room, which may be part of the system shown in Fig. 22. Fig. 24 is a view in end elevation of a double-faced rack, partly broken away, for supporting two rows of boxes, four boxes being shown in position. Fig. 25 is a view illustrating the application of rack-bars to a desk for the temporary support of file-boxes, showing also a file-case formed as part of the desk. Fig. 26 is a diagrammatic view in top plan, showing the application of my rack system to the construction of a revolving file-rack.

The two main features of my invention are, first, a rack for erection in a room, as in Figs. 22 and 23, or in a wall-case, as in Fig. 1, or in a desk-case, as in Fig. 25, or in a revolving rack, as in Fig. 26, the prime requisite of which shall be that it shall form a horizontal support to receive and support the second main feature—viz., a file-box provided with latches whereby it may be instantly pulled off such horizontal support or pushed into position and held thereon without the manipulation of any devices other than a suitable handle, permitting of the removal and replacing of the box upon the rack with one hand.

In the drawings, the letter A, with its several exponents, illustrates the horizontal support B, with its exponents, the forms of boxes, and C, with its exponents, the styles of latches. The horizontal supports may be of many forms, preferably for general purposes a horizontal pipe, (marked A in Figs. 2 to 10 and 16 to 21, A' in Figs. 22 and 23, $A^2$ in Fig. 24, $A^3$ $A^4$ in Fig. 25, and $A^5$ in Fig. 26,) although the horizontal channel-beam $A^6$ of Fig. 11, the horizontal T-beam $A^7$ of Fig. 12, the upper and lower walls $A^8$ $A^9$ of the notches $a^8$ $a^9$ in the vertical T-beam $a$ in Fig. 13, and the upper and lower walls $A^{10}$ $A^{11}$ of the notches $a'$ $a^2$ in the plate $a^3$ in Figs. 14, 15, form substantial supports and may be specially useful in some situations. The file-boxes may also be of any suitable form; but for the purpose of illustrating my invention I have in Figs. 2 to 8, 17 to 21, and 24 shown a plain box of rectangular form, while in Figs. 9, 10, and 16 the box is shown as composed of two parts $B'$ $B^2$, each of substantially triangular form, the front part $B^2$ being hinged at $b$ to the rear part $B'$. The boxes shown in Figs. 1 and 25 (marked B) and presumably of the first-mentioned form being shown only in front elevation might be of the second or any other preferred form.

The third main feature—viz., the latches by which the boxes are secured upon the supports—may also be of many forms, the first essential of their construction being that they must be so formed and mounted that they will automatically engage the horizontal supports when pushed against them and readily release themselves when pulled outward away from the supports. To accomplish this result, these latches may be both yielding, as shown at C C' in Figs. 3 to 8, 10, and 17 to 21, or one rigid and one yielding, as shown at C $C^2$ in Figs. 9 and 16.

Having provided a pair of horizontal supports, as A in Figs. 2 and 3, secured rigidly in any suitable case, frame, or rack, a file-box, as B in Figs. 2 and 3, and a pair of latches, as C C' in Figs. 2 and 3, secured on the box with the essential capacity of engaging upon the supports automatically when pushed inward or, I might say, backward against them and disengaging themselves from the supports when pulled outward or forward, the broad idea of my invention is carried out, and the detailed description of the construction and operation of this development will now be given in advance of that of the various modifications.

It may be observed that the two supports are pipes A, horizontally placed one above and parallel with the other in the same vertical plane and at a distance from each other from center to center equal to the height of the file-box B. This permits the lower latch C of one box and the upper latch C' of the next box below it to be engaged on the same support, thus causing a single support to serve for a latch of two boxes, while if they were otherwise placed a support would be required for each latch of each box.

The latches C C' are preferably formed by stamping, cutting, or otherwise of sheet metal, are pivoted at their front ends on pins or rivets $c$ in position to bring their outer edges flush with the top and bottom of the box when in their normal or spread positions, are pressed outward by springs $c'$, and are limited in their outward movement by pins $c^2$, projecting from the sides of the box into slots $c^3$ in the latches. The box is provided with a suitable pull bail, handle, or ring $b^2$, and the front of the box projects laterally beyond its sides, forming flanges $b'$ of a width sufficient to close the front of the space occupied by the latches.

The boxes will be preferably made of sheet metal for strength, lightness, durability, and economy of interior space, as well as to render them substantially fire, water, and vermin proof, and a suitable top may be provided to make them dust-proof.

When it is desired to remove one of the boxes—say the middle one in Fig. 3—it will only be necessary to grasp the handle or ring and pull outward. This will cause the latches to approach each other, the springs yielding, and the notches $c^4$ in the latches to leave the supports A, leaving the box free therefrom and in the hands of the user. To replace the box on the support, it will only be necessary to start the beveled inner ends $c^5$ between the supports and push the box inward, the latches yielding until the notches $c^4$ are again engaged on the supports, and with a light spring-pressure a box will be so firmly held as to support a very heavy weight many times more, I have found in practice, than the weight of papers enough to fill any ordinary file-box. To utilize channel-beams, as at $A^6$ in Fig. 11, horizontal T-beams, as at $A^7$ in Fig. 12, notched vertical T-beams, as at $a$ in Fig. 13, notched plates of metal, as at $a^3$ in Figs. 14 and 15, or any other support showing an angular section, the notches $c^4$ in the latches must be made angular instead of semicircular.

From the foregoing the extreme utility and many advantages of my invention, broadly speaking, will be obvious. The supports may be secured in any desired position, numbering only one more than the number of horizontal rows of boxes. They may be of ordinary pipe, which when fitting up a room, as hereinafter described, may be used for conduits for gas, water, or electric wires. They are strong and cheap. No shelves or partitions are required between the horizontal or vertical rows of file-boxes, whereby every inch of space is utilized. The boxes may be instantly pulled off or snapped upon the supports and when taken off—as, for instance, off a support in a file-room—may be snapped upon similar supports in any other rack or case or upon supports, as at $A^3$ in Fig. 25, secured at the side, or $A^4$ upon the top of a desk, where their contents may be consulted by the occupant of the desk, the boxes always remaining in place, avoiding the littering up of the desk, floor, or chairs with loose files or boxes.

In carrying out my invention many modifications have occurred to my mind in the supports and boxes, the latches, and other details, some of which I have illustrated, and the construction, operation, and advantages of which will now be described, beginning with the boxes, of which only one modification is shown and that a well-known construction, as in Figs. 9, 10, and 16, merely to illustrate the application of my invention to various forms of boxes. In this modification of the box the only difference in construction has been before set forth herein, and further detailed description thereof is unnecessary. The object of hinging the front section is merely to give freer access to the contents of the box, which may be had by turning the front section outward on its hinge.

In the construction and arrangement of the latches shown in Fig. 3 and hereinbefore described both latches yield toward each other, and in several of the modifications the latches are arranged to produce the same result. In Fig. 10 the arrangement differs only in the shape of the upper latch and the consequent change in the position of its spring. In Fig. 21 both latches are formed of spring rod or wire and are consequently both yielding, being in this instance of a single piece coiled around a pin $c^6$ and held against lateral displacement or excessive outward movement by confinement under a keeper $c^7$, secured to the side of the box.

It will be understood that all the latching and locking mechanisms are duplicated on the opposite sides of the boxes. In Fig. 17 the latches are angular in shape, crossing each other at their inner ends and provided with slots $d$. The ends of a bail E are pivotally connected in these slots. The legs of the bail pass through the flanges $b'$ of the box and are connected in front by a cross-bar $e$ of the bail. Springs $e^2$ encircle the bail with a tendency to force it inward, and thus yieldingly press the outer ends of the latches outward to engage the supports, the latches in this instance being pivoted intermediate their ends at $c$, instead of their ends, as in Fig. 3. To remove the box from the support, it is only necessary to pull it outward, as before, either by an ordinary pull-handle or by the bail serving as a handle. In the latter instance the first movement of the bail moves the outer ends of the latches away from the supports.

In Figs. 9 and 16 the upper latch $C^2$ is rigid, while the lower latch C is yielding when unlocked, as hereinafter described. In Fig. 16 the lower latch yields against its own gravity only, and a locking-bar $c^8$ is pivoted to the side of the box in position to hold the latch locked on the support when said locking-bar hangs vertical. Each locking-bar $c^8$ has pivoted to its lower end a bar $c^9$, extending forward through the flange $b'$ of the box, turned down at its front end, and connected with its fellow on the opposite side of the box by a rod $c^{10}$. This forms a handle by means of which the locking-bar may be pulled forward to permit the latch C to yield, and the turning down of the front ends of the bars $c^9$ permits of the placing of the rod $c^{10}$ low enough to be out of the way of the front section of the box when turned outward, the rod $c^{10}$ being so placed as to serve as a stop and rest for said front section of the box. When the locking-bar is in, as in Fig. 16, it holds the latches rigidly in engagement with the support A and prevents the removal of the box without pulling the locking mechanism forward.

The constructions of Figs. 3, 10, 17, 18, and 21 are the only ones which have the latches both yielding and without locking devices.

In Figs. 4 to 8 and 16 to 20 the latches are both yielding, but are connected with locking mechanism.

In Figs. 4, 5, and 6 a turn-button D is pivoted to the sides of the box between the latches in position and of the proper length to lock the latches in their engaged or outer positions when the button is vertical. To the turn-buttons on opposite sides of the box are pivotally attached the ends of the bail $e$, which passes through the flanges $b'$ of the box across the front of the box, being bent outward at the middle, as at $e'$ $b^2$, to leave room in which to engage the fingers or a hook for operating the bail and carrying the box. This bail is normally pressed inwardly by a spring $e^2$, coiled around each leg (see Fig. 6) and having its end bearings against the flanges $b'$ and a pin $e^3$ in the bail, respectively. The normal tendency of the springs $e^2$ is to force the bail inward and the turn-button to its locked position, as in Fig. 5. When the turn-button is in its unlocked position, the latches are held yieldingly in contact with it by springs $e^4$. The springs $e^4$ are much weaker than springs $e^2$, so that when the bail is free the springs $e^2$ cause it to automatically lock the latches to the supports. To remove the box from the support, the bail is pulled outward, its movement unlocking the latches, after which the bail serves as a handle for the box.

In the construction of Figs. 7 and 8 toggle-bars $e^5$ are substituted for the turn-button, said toggle-bars being pivotally connected to the latches and to each other, the mode of operation and results being the same as in the construction of Figs. 4, 5, and 6.

In Fig. 17 the latches C C' are elbow-levers pivoted at their angles, at $c$, to the sides of the box. Their inner ends cross each other and are slotted at $d$. The inner ends of the bail $e$ enter these slots and operate both the latches simultaneously when the bail is moved outward or inward, the bail being actuated inwardly by a spring $e^2$, as in the constructions of Figs. 4 to 8.

In Fig. 18 the latches C C' are elbow-levers, one end of each pivoted to the sides of the box at $f$ and the other ends slotted, as at $f'$. A flat metal bail F has its legs $f^2$ pivotally connected in the slots, passed forward under keepers $f^3$ and through flanges $b'$ of the box, and connected at the front by cross-handle $f^4$. A spring $f^5$ presses the bail inward, yieldingly pressing the latches outward, the slots permitting them to yield inward against the action of the springs.

In Fig. 19 the turn-button D is provided with a rigid bail-handle G and a spring $g'$, bearing on the handle, to normally hold it in the locked position. By raising the bail the latches are released and are free to yield to permit of the drawing away of the box.

In Fig. 20 the latches are provided with opposite arms $h$ with inclined inner ends. The spring-pressed bail H has wedge-shaped inner ends $h'$ on its legs, said legs being guided by pins $h^2$ in slots $h^3$. The spring $h^4$ presses the bail normally inward, keeping the wedge-shaped ends $h'$ between the inclined ends of the arms $h$ of the latches. The latches are normally drawn toward each other by springs $h^5$. The springs $h^4$ are stronger than springs $h^5$, and thus hold the wedge ends yieldingly between inclined ends $h'$, rendering the latches yielding.

File-boxes provided with any of my improved attaching devices hereinbefore described may be secured, as before mentioned, to any of the forms and modifications of supports set forth, and the preferred form A of the support, consisting, broadly, of a horizontal round pipe or rod, may be mounted, secured, or arranged in many different ways and in various structures and situations.

A simple arrangement is shown in Figs. 1 and 2, in which I indicates the back, and I' I' the sides, of any ordinary form of upright case, suitably furnished with a base I² and cornice I³, the whole case being made of any desired material, such as wood or metal, the latter being preferred if a fireproof structure is desired. There are represented in this structure thirty-six file-boxes, arranged in six horizontal rows of six boxes each, and the latches C C' of these boxes are shown in Fig. 2 as engaged upon seven horizontal pipe-supports A, secured in any suitable manner in the sides I' I' of the case. It will be noted that, as before stated, the latches of adjacent superposed boxes engage the same horizontal support, and it will be readily understood that to permit this the latches must be flush with the top and bottom of the boxes to which they are attached. This form of case forms what I would term a "single" rack—that is to say, a rack facing all one way—to support but a single tier of file-boxes, and the supports A for such a single rack might be secured against the wall of room, as shown in Figs. 22 and 23, or on a pipe-rack, as in Fig. 24. In the last-named figure the supports A are secured in vertical end supports, consisting, essentially, of vertical pipes, rods, or posts J, fittings J' serving to receive the ends of support A. This figure also shows how a rack with a single row of supports may be made a double rack to support two tiers of boxes B facing in opposite directions, part of the end of the rack being broken out to show the boxes applied on the supports. Either the single or double pipe-rack would preferably be provided with posts K K at the front corner of each tier of boxes connected to posts J by cross-pipes K' K', &c., although such additions are not absolutely necessary, it being possible to rigidly secure the posts J in position without such bracing.

A further development of the single pipe-rack is shown in Fig. 23, in which this form is applied to the whole or a large portion of the side of a room and of a height to render it impossible to reach all the boxes from the floor. To overcome this difficulty, the end posts L and intermediate posts L', when required or deemed preferable, are made to support a skeleton platform M, which may be used to stand upon to handle the upper file-boxes.

Fig. 22 illustrates both the single and double pipe-racks, as well as platforms for elevated tiers of file-boxes, as they may be arranged to equip a file-room. In this development the supports are in single-rack form around the walls and of double-rack form in the center of the room, the supports A around the walls being arranged substantially as in Fig. 23 and in the central or double racks substantially as in Fig. 24, except that the latter are also of what might be called "two-story" form also. In this view, Fig. 22, the whole illustration might be called "diagrammatic," the scale being too small to show more than outlines and positions. There are horizontal supports N connecting the double and single racks, upon which are arranged platforms M, preferably consisting of a rod or wire mats, so as to give light below them, and the horizontal supports might be utilized as ladders to reach the platforms, although separate ladders, as at N, might sometimes be preferred. Small sections of racks might be provided upon the top or side of a desk, as in Fig. 25, or at any other convenient place to support the file-box in position within easy reach of the occupant of the desk either for a permanent arrangement or for temporary use. Part of the desk might be formed into a file-case after the general style of the case shown in Fig. 1, such an arrangement being seen on the left-hand front of the desk in Fig. 25. A single central supporting pipe, pillar, or rod, as at O in Fig. 26, may be mounted in a platform, as P, in said figure, arranged to revolve on a suitable stand, and supports A secured centrally thereto to form a double revolving rack supporting a double tier of file-boxes B. Such a structure might be provided with end supports for the supports A; but this is not essential. This embodiment of the invention would form a very handy revolving file-rack. The supports for the boxes in almost any imaginable situation might, as before stated, consist of the forms illustrated in Figs. 11 to 15 instead of round rods or pipes A; but the latter will probably be preferred in most situations.

The advantages pertaining to the various constructions hereinbefore described will be obvious from the description and illustration and need not be further enumerated here, and although I have illustrated and described a number of modifications of the various features many more will suggest themselves in the practical development of the invention. Such modifications as involve any or all of the features of my invention will be clearly included within its spirit and scope.

Having thus fully described my invention, what I claim as new, and desire to secure by Letters Patent of the United States, is—

1. A file-box provided with means for securing it upon and removing it from parallel horizontal supports located rearward of the box, said means being automatically operated to engage upon the supports when the box is pressed toward them, and to be released from the supports when the box is moved away from them, substantially as described.

2. A file-box provided with oppositely-faced latches arranged to engage upon or be released from parallel horizontal supports when the box is pushed toward or drawn away from the supports, substantially as described.

3. A file-box provided with oppositely-faced latches, one of which is yieldingly mounted, said latches being arranged to be engaged upon or released from parallel horizontal supports when the box is pushed toward or drawn away from the supports, substantially as described.

4. A file-box provided with oppositely-faced latches mounted to yield toward each other and arranged to engage upon or be released from parallel horizontal supports when the box is pressed toward or drawn away from the supports, substantially as described.

5. A file-box provided with oppositely-faced, spring-actuated latches arranged to engage upon or to be released from parallel horizontal supports when the box is pressed toward or drawn away from the supports, substantially as described.

6. A file-box provided with oppositely-faced movable latches, one of which is spring-actuated, said latches being arranged to engage upon or be released from parallel horizontal supports when the box is moved toward or away from the supports, substantially as described.

7. A file-box provided with oppositely-faced movable latches, one of which is spring-actuated away from the other, said latches being arranged to engage upon or be released from parallel horizontal supports when the box is moved toward or away from the supports, substantially as described.

8. A file-box provided with oppositely-faced movable latches, both of which are spring-actuated, said latches being arranged to engage upon or be released from parallel horizontal supports when the box is moved toward or away from the supports, substantially as described.

9. A file-box provided with oppositely-faced movable latches, both of which are spring-actuated away from each other, said latches being arranged to engage upon or be released from parallel horizontal supports when the box is moved toward or away from the supports, substantially as described.

10. A file-box provided with yielding latches secured to its sides, one above the other, projecting beyond the rear of the box and provided with notches in their outer edges to engage upon parallel horizontal supports, substantially as described.

11. A file-box provided with latches secured to its sides, one above the other, projecting beyond the rear of the box and provided with notches in their outer edges to engage upon parallel horizontal supports, and a spring for pressing one of the latches away from the other, substantially as described.

12. A file-box provided with two latches pivoted forward of their rear ends to the sides of the box, projecting beyond the rear of the box and provided with engaging notches in their outer edges, and springs for pressing the latches away from each other, substantially as described.

13. The combination with an upper and a lower horizontal support, of a file-box provided with latches projecting beyond its rear face and arranged to automatically engage said supports when pressed between them, and to be disengaged therefrom when moved away from them, substantially as described.

14. The combination with an upper and a lower horizontal support, of a file-box provided with spring-pressed latches projecting beyond its rear face and arranged to automatically engage said supports when pressed between them, and to be disengaged therefrom when moved away from them, substantially as described.

15. The combination with an upper and a lower horizontal support, of a file-box provided with upper and lower yielding latches having engaging notches in the upper and lower edges respectively, projecting beyond its rear face and arranged to automatically engage said supports when pressed between them, and to be disengaged therefrom when moved away from them, substantially as described.

16. The combination with upper and lower horizontal supports, of a file-box provided with an upper latch having an engaging notch in its upper edge, a lower latch having an engaging notch in its lower edge, and springs for separating the latches to engage their notches on the supports, substantially as described.

17. A file-box provided with oppositely-faced movable latches, spring-actuated away from each other, and stops for preventing them from moving beyond the edges of the box, substantially as described.

18. A file-box provided with outwardly and oppositely placed latches mounted to yield inwardly to lessen the distance between their engaging ends and provided with stops to limit their outward movement, substantially as described.

19. A file-box provided with outwardly and oppositely placed latches mounted to yield inwardly to lessen the distance between their engaging ends and provided with locking devices to hold them in their outermost positions, substantially as described.

20. A file-box provided with movable latches, springs for actuating them to engage horizontal supports, and stops for limiting their engaging movement, substantially as described.

21. A file-box provided with outwardly-faced movable latches, springs for actuating them outward away from each other, locking devices for holding them in their outermost positions, and stops for limiting their outward movement, substantially as described.

22. A file-box provided with outwardly-faced movable latches attached to its sides and mounted to yield away from their engaging positions, a locking device to hold them in their engaged positions, and means for operating the locking devices extending beyond the front of the box and serving as a handle, substantially as described.

23. A file-box provided with two latches on each side, one above the other, pivoted to the sides of the box, a locking device on each side to hold the latches on each side in engaging position, and a bail secured at its ends to the locking devices on the opposite sides and passing around the front of the box to serve as a handle, substantially as described.

24. A file-box provided with two latches on each side, one above the other, pivoted to the sides of the box, a locking device on each side to hold the latches of each side in engaging position, a bail secured at its ends to the locking devices on the opposite sides and passing around the front of the box to serve as a handle and springs to force the bail rearwardly, substantially as described.

25. A file-box provided with oppositely-faced latches attached to its side, a locking device for said latches, and a spring for normally holding the locking device in its locked position, substantially as described.

26. A file-box provided with oppositely-faced latches attached to its side, a locking device for said latches, a rod for operating the locking device from the front of the box, and a spring actuating the rod to maintain the locking device in its locked position, substantially as described.

27. The combination with upper and lower horizontal supports, of a file-box provided with an upper latch having an engaging notch in its upper edge, a lower latch having an engaging notch, in its lower edge, springs for separating the latches to engage their notches on the supports, and locking devices for maintaining the latches rigidly in engagement with the supports, substantially as described.

28. The combination with three parallel supports, of two file-boxes, one provided with upper latches facing upward and the other with lower latches facing downward, the boxes being arranged one above the other, with the upper latch of the lower box, and the lower latch of the upper box engaging the middle support below and above, and each box having a latch to engage the upper and lower support, respectively, substantially as described.

29. The combination with a series of parallel horizontal bars or pipes, and a plurality of vertical tiers of file-boxes, with their rear faces toward said bars or pipes, of latches attached to the sides of the boxes, one above the other, projecting beyond the rear ends of the boxes, for engaging said bars or pipes, the lower latches of upper boxes and the upper latches of the next lower boxes of each tier engaging the top and bottom of the same supports, respectively, substantially as described.

In testimony whereof I affix my signature in presence of two witnesses.

JOHN W. BRASHEARS.

Witnesses:
THOS. A. TIMBERLAKE,
IRVIN C. FOSTER.